United States Patent [19]

Esplin

[11] Patent Number: 5,188,150

[45] Date of Patent: Feb. 23, 1993

[54] VALVE ASSEMBLY

[76] Inventor: Trevor T. Esplin, 1/1 Prior Avenue, Cremorne, Australia, 2090

[21] Appl. No.: 634,221

[22] PCT Filed: Jun. 9, 1988

[86] PCT No.: PCT/AU89/00251

§ 371 Date: Dec. 7, 1990

§ 102(e) Date: Dec. 7, 1990

[87] PCT Pub. No.: WO89/12192

PCT Pub. Date: Dec. 14, 1989

[30] Foreign Application Priority Data

Jun. 9, 1988 [AU] Australia ............................ PI8710
Jul. 19, 1988 [AU] Australia ............................ PI9346
Oct. 7, 1988 [AU] Australia ............................ PJ0831
May 26, 1989 [AU] Australia ............................ PJ4386

[51] Int. Cl.[5] .............................................. F16K 1/44
[52] U.S. Cl. ........................... 137/630.14; 251/360; 251/364; 251/900
[58] Field of Search .............. 251/332, 360, 364, 900, 251/85; 137/516.29, 630.22, 630.14

[56] References Cited

U.S. PATENT DOCUMENTS

| | | | |
|---|---|---|---|
| 2,060,748 | 11/1936 | Roberts | 251/332 |
| 2,210,046 | 8/1940 | Schubring | 251/364 |
| 2,616,653 | 11/1952 | Tarr | 251/364 X |
| 2,673,062 | 3/1954 | Cornelius | 251/332 X |
| 2,959,392 | 11/1960 | Von Platen | 251/332 |
| 2,969,951 | 1/1961 | Walton | 251/364 X |
| 3,318,577 | 5/1967 | Banks | 251/332 |
| 3,441,051 | 4/1969 | Morse | 251/332 |
| 3,548,869 | 12/1970 | Weise | 137/516.29 |
| 3,557,837 | 1/1971 | Giwosky | 251/85 X |
| 3,618,893 | 11/1971 | Bois | 137/630.22 |
| 4,008,298 | 2/1977 | Quantz | 251/85 X |

*Primary Examiner*—Robert G. Nilson
*Attorney, Agent, or Firm*—Townsend and Townsend

[57] ABSTRACT

A valve assembly which comprises an upper valve assembly and a lower valve assembly. The upper valve assembly includes a valve body, a spring retainer and an upper spring. The lower valve assembly includes a retainer ring, an O-ring and a valve seat member. The valve body comprises a valve disc and a valve stem. The valve disc has a lower peripheral surface which is bevelled, and the lower extremity of the bevelled surface meets an annular protrusion which has a flat lower surface. The O-ring fits within respective grooves provided in the retainer ring and the valve seat member. The valve seat is arranged to be located in a valve port, and when the upper valve assembly is moved downwardly the annular protrusion is forced against the O-ring which then forms an additional seal with the adjacent housing of the valve port to completely close the valve assembly.

16 Claims, 6 Drawing Sheets

FIG. 8

# VALVE ASSEMBLY

FIELD OF THE INVENTION

This invention relates to a valve for use in the control of fluid flow in a pipe system. The invention has particular application to a tap which is used for controlling the supply of mains-pressure water and, for convenience of reference, the invention is hereinafter described in the context of such application. However, it will be understood that the invention does in fact have broader application, to many different types of valve structures and various fluid pressures.

BACKGROUND OF THE INVENTION

Conventional taps as described in Australian Standards 1718-1988 and 3718-1988 comprise a metal body having an inlet end which is connectable to a supply pipe, an outlet end in the form of a spout, and a passageway extending between the inlet and outlet ends. An opening (hereinafter referred to as a valve port) is provided in the passageway, which is surrounded on its upper surface by an annular valve seat. A valve member is carried by a spindle which is engaged in threaded relationship with a spindle housing, and the spindle can be turned in one direction to drive the valve member against the valve seat and thereby "close" the tap. The tap is "opened" by turning the spindle in the opposite direction.

The valve member usually comprises a resilient washer which is carried on a loose jumper valve which is connected to its valve stem, and the stem is slidable in the spindle. Thus, when the tap is opened, the spindle is screwed in a direction away from the valve seat and the valve member is forced open against the spindle by water pressure.

The tap as above described would normally form one of a network of taps throughout a building. Thus, the water pressure which would be acting on the valve member in any one tap will be dependent upon the number of taps which are opened and closed in the network.

In some situations, taps are left permanently open, for example when they are attached via hoses or other pipes to domestic washing machines and/or dishwashers etc. In-line taps are also used to isolate certain areas of a building and/or to isolate toilet cisterns and hot water services. In these situations, where no water is flowing through the taps, a valve member may be fully open or closed, or be in a floating intermediate position. Then, should a sudden increase in water pressure occur, for example when a tap in another location is quickly turned off resulting in a shockwave being created within the pipe, the increased pressure will force the valve member to slam against the spindle or valve seat. The noise produced by this phenomenon is commonly referred to as water hammer and can be a source of considerable annoyance in a household or other situation because of the level of noise produced. Water hammer is just one of numerous problems which are prevalent in taps which utilize conventional valves. Some of the more common problems associated with conventional valves are listed as follows:

1. Many taps are difficult to turn on and off and this problem is compounded with wear and tear of the washer.
2. Many valves and washers have a low service life.
3. Washers are usually less efficient as they become older and more worn.
4. Valves vary in efficiency from hot to cold water.
5. Conventional valves usually cause water noise when a tap is turned on.
6. Because of the rotational friction that exists when turning on and off a tap, the valve seat of a tap is usually worn away as well as the valve washer.
7. In taps which are part of a pipe network backfeeding or backsyphonage can also occur.
8. Conventional tap valves cannot effectively handle wide fluctuations in water pressure as small movements of the tap handle and spindle result in coarse adjustments of water flow.
9. Older taps often continue to drip even when turned off firmly.
10. Taps, like those found on the boundary of a property (meter taps), which are left open for years suffer from washer deterioration. When these taps are eventually turned off they leak badly.

DISCLOSURE OF THE INVENTION

According to the present invention, there is provided a valve assembly for control of fluid flow in the pipes. The valve assembly comprises a valve body member, a valve seat member and an annular sealing member which is arranged to be located around the periphery of the valve seat member by a locating means. In use, the valve seat member and annular sealing member are separated from a valve seat, and when the valve body member is forced against the annular sealing member the annular sealing member then forms a seal with the valve body member and valve seat.

Preferably the valve body member comprises a valve disc and a valve stem.

Preferably the locating means comprises a peripheral groove in the valve seat member, which is arranged to receive the annular sealing means.

A retaining ring may also be provided which is arranged to fit tightly around the outer circumference of the annular sealing member.

The valve disc may have an annular sealing surface on its lower face.

In a preferred form of the present invention the annular sealing surface protrudes from the lower surface of the valve disc.

Preferably the annular sealing surface is substantially flat.

The valve seat member may be tubular and arranged to fit into the valve port of a tap.

A retaining means is preferably provided for preventing the valve seat member from falling through the valve port of a tap.

The peripheral groove in the valve seat member is preferably positioned at the upper end thereof such that when in use the peripheral groove is arranged to be on the valve seat side of the valve port.

It is preferred that the retaining means comprise a lug collar which is arranged to rest on the valve seat side of the valve port housing.

The valve seat member may comprise a flow regulation cap which is arranged to be fitted on the lower end of the valve seat member.

Preferably the valve seat member comprises a passage from the peripheral groove to its inside surface.

The retaining ring may comprise a lip on its top surface which is arranged to extend beyond the outer periphery of the valve disc when in use.

Preferably the lip comprises holes which are arranged to allow fluid to pass therethrough.

The lip may be arranged to extend substantially parallel to the central axis of the retaining ring.

It is preferred that the lip is arranged to extend a sufficient length, so that when in use the lip touches the upper housing of the tap and prevents the retaining ring, annular sealing member and valve seat member from moving away from the valve seat.

The size of the holes are preferably arranged to be varied to regulate flow of fluid therethrough when in use.

It is further preferred that the valve assembly comprise a spring retainer which is annular and is arranged to fit over the valve stem and rest on the upper surface of the valve disc and an upper spring which is arranged to fit over the valve stem and rest on the spring retainer.

The spring retainer may comprise an upstanding annular portion which is arrange to contain the lower end of the upper spring and reduce sideways movement of the upper spring.

The upstand on the spring retainer also removes the spring from the turbulent water flow in the tap body and aids quieter operation. It also stops the valve member from fully opening when used in a situation where the spring has been removed.

Preferably the lower peripheral surface of the valve disc is stepped.

Alternatively the lower peripheral surface of the valve disc is bevelled.

Preferably the edges of the bottom surface of the valve seat member are bevelled or rounded.

It is preferred that the lower surface of the valve disc comprise; an annular recess which is arranged to receive the upper end of a lower spring which in use is arranged inside the valve seat member between the valve disc and an internal retainer at the lower end of the valve seat member. Also, by changing the spring rate and increasing it, the valve can simulate a pressure limiting valve when open and the stronger spring can also be a flow restrictor. Also, if removing the spring altogether the valve can handle low pressure applications.

The annular sealing means may be a NITRILE O-ring.

According to one embodiment of the Present invention there is provided a valve seat member for use in a tap, comprising a tubular body having a peripheral groove in its upper external surface, the valve seat member being arranged to receive an annular sealing member in its peripheral groove so that when in use in a tap the annular sealing member forms a seal with a valve disc and another seal with the valve seat of the tap when the valve disc is forced against the annular sealing member.

BRIEF DESCRIPTION OF THE DRAWINGS

The present invention will now be described by way of example only with reference to the following drawings in which.

BEST METHOD OF PERFORMING THE INVENTION

Figure 1:
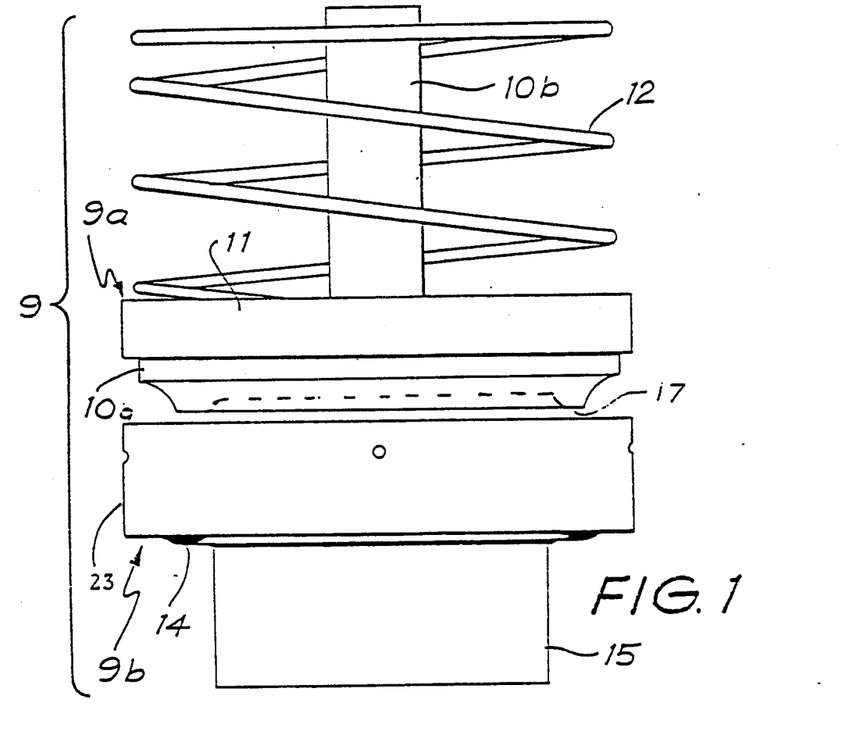
FIG. 1 shows a front view of the valve assembly according to a first embodiment of the present invention.

Referring to the first embodiment of the invention as shown in FIG. 1 the valve assembly 9 comprises an upper valve assembly 9a and a lower valve assembly 9b. The upper valve assembly 9a includes a valve body 10, spring retainer 11 and upper spring 12. The lower valve assembly 9b comprises a retainer ring 23, O-ring 14 and valve seat member 15.

Figure 2:
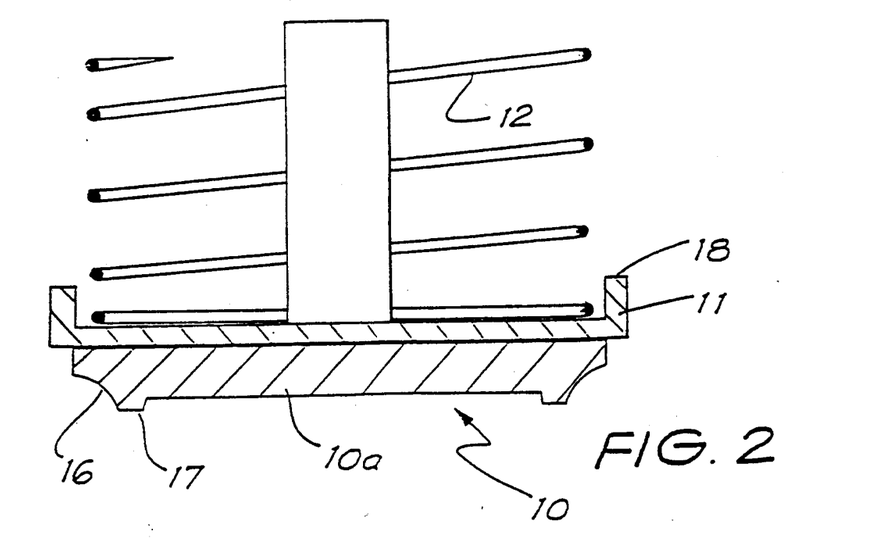
FIG. 2 shows a sectional view of the valve body and spring retainer of FIG. 1.

As shown in FIG. 2, the valve body 10 comprises a valve disc 10a and a valve stem 10b. The valve stem 10b is similar to conventional valve stems, however, the valve disc 10a has a lower peripheral surface 16 which is bevelled. The lower extremity of the bevelled surface meets an annular sealing surface 17 which has a flat lower surface.

On the upper surface of the valve disc 10a, the spring retainer 11 is located and comprises an annular lip 18, which has an internal diameter greater than the outer diameter of upper spring 12. The upper spring is a compression spring and fits over the valve stem and sits on the spring retainer.

Figure 3:
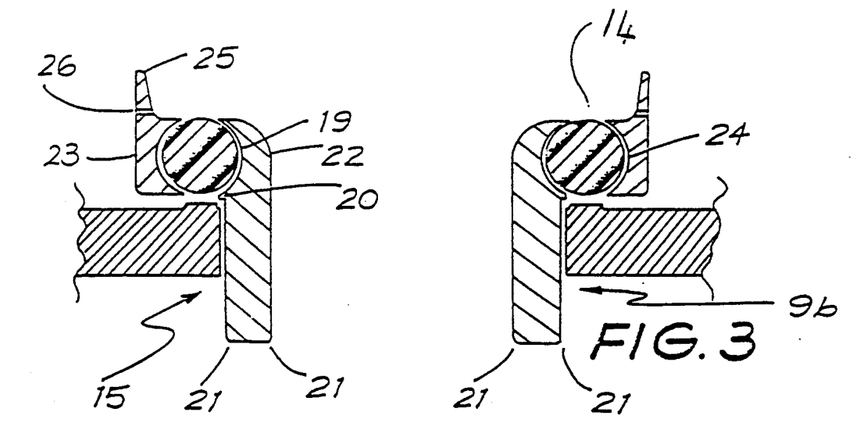
FIG. 3 shows the valve seat member together with an O-ring and retaining ring of FIG. 1.

With reference to FIG. 3, the construction of the lower valve assembly 9b will now be described.

The valve seat member 15 is effectively a cylindrical tube having an arcuate peripheral groove 19 located in its upper outer end. The lower extremity of the peripheral groove forms into a small collar 20, while at the top extremity of the groove the upper surface curves into the inside of the tube 22 while at the lower end of the valve seat member an essentially flat surface is provided with rounded edges 21 on the inside and outside.

Figure 4:
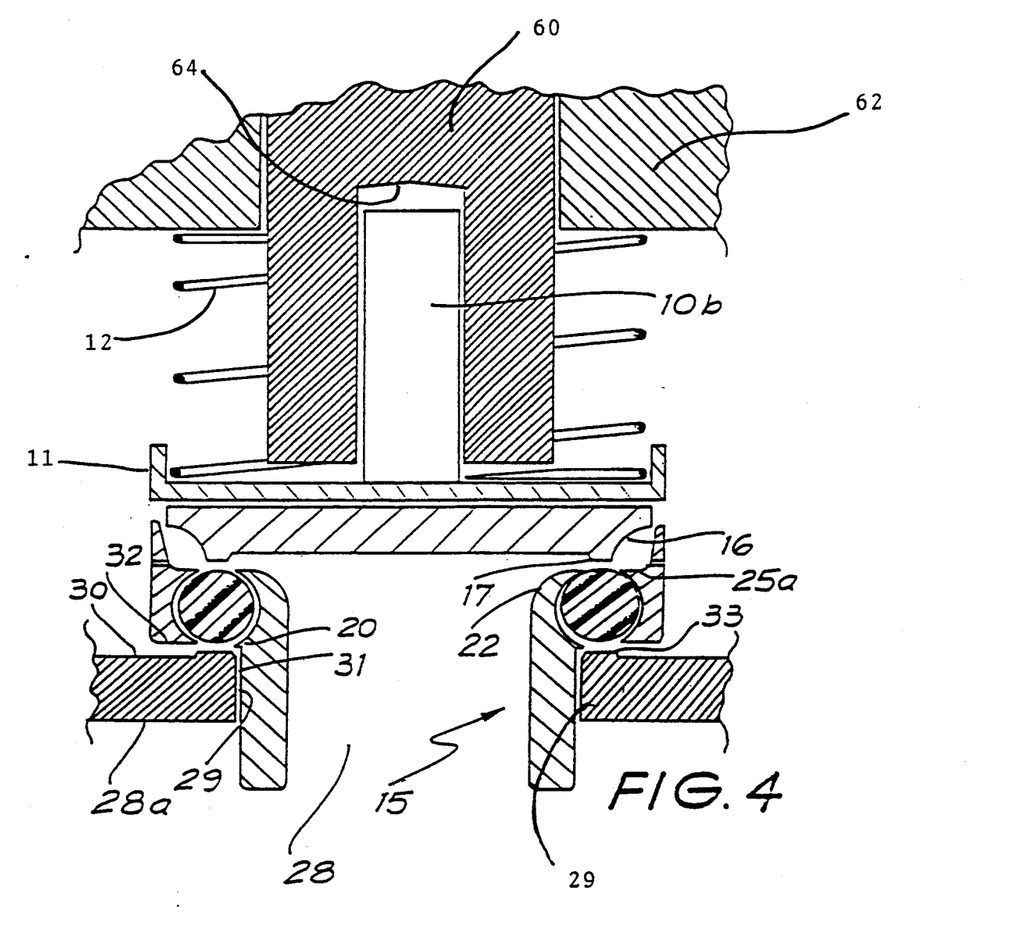
FIG. 4 shows a sectional view of the first embodiment of the valve assembly when in a tap fitting.
Figure 5:
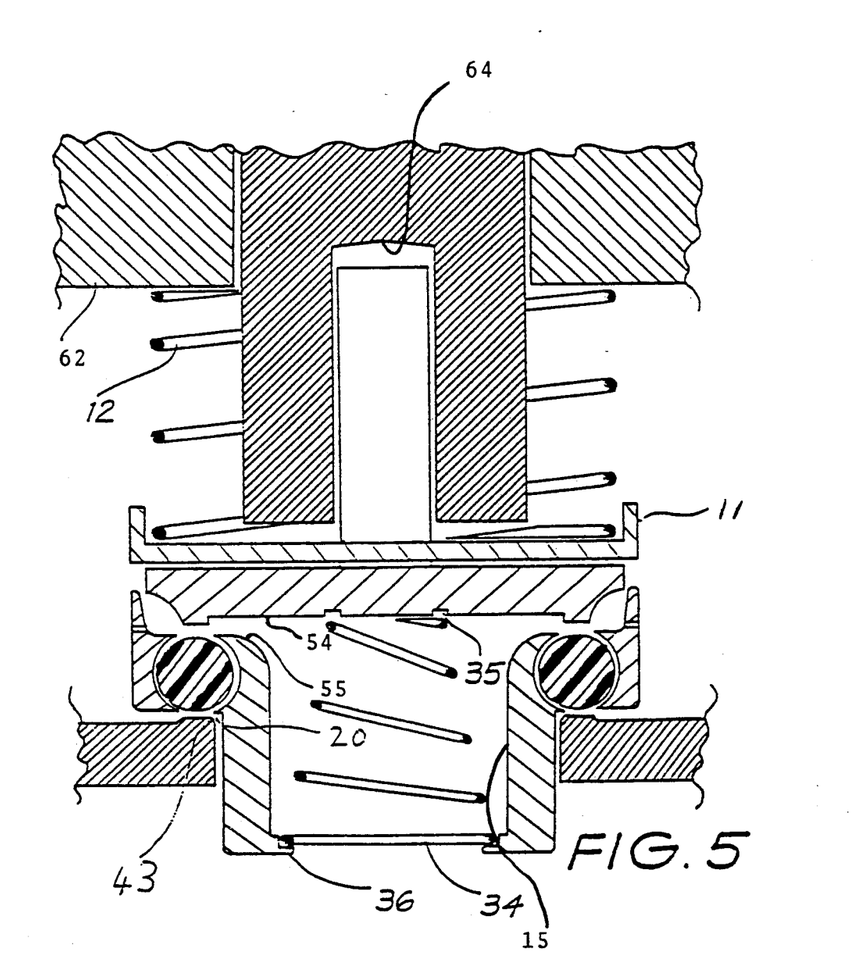
FIG. 5 shows a sectional view of a second embodiment of the present invention.

The O-ring seal 14 is typically a NITRILE ring and fits snugly into the peripheral groove of the valve seat member 15. A retainer ring 23 fits tightly over the O-ring such that the O-ring fits snugly into the arcuate circumferenial groove 24 provided therefore in retainer ring 2. On the upper surface of the retainer ring, an annular lip 25 is provided which protrudes vertically from the outer edge of the top surface of the retainer ring. In one form of the present embodiment the lip is arranged so that the valve disc 10a can fit interiorly thereof as illustrated in FIGS. 4 and 5. Holes 26 may be provided horizontally through this lip 25.

Functional aspects of Preferred embodiments of the valve assembly will now be described when located inside a tap.

As shown in FIG. 4, the valve stem 10b of the valve body is located within the spindle bore of a tap.

As illustrated in FIG. 4, the valve port 28 has a diameter which extends between surfaces 29 of valve port housing 28a and allows the valve seat member 15 to fit loosely into it. The collar 20 prevents the valve seat member falling all the way through the valve port 28.

With the valve assembly components in the position shown in FIG. 4, water is able to pass between the bottom of the valve disc 10a and the top of the assembly comprising valve seat member 15, O-ring 14, retainer ring 23. Specifically between surfaces 17 and 16 of the valve disc and 22 and 25a of the lower valve assembly.

In addition water passes between the outer surface of the valve seat member and the adjacent valve port housing 28a of the valve port and passes underneath the O-ring and the adjacent retainer ring. Specifically the water flows between surfaces 29 and 30 of the housing 28a of the valve port and surfaces 31 and 32 of the lower valve assembly.

Because water flows underneath the lower valve assembly, this creates a "floating" position for the lower valve assembly and helps minimize wear, by providing a fluid filled gap between the lower valve assembly 9b and the tap valve port housing 28a.

As the spindle descends and the valve closes, the water flow rate between the surfaces 16, 17 and 22, 25a is deminished until eventually it approximates the same flow rate as the water flowing between surfaces 29, 30 and 31, 32.

After the equilibrium between the two flow rates is achieved and, as the annular sealing surface 17 approaches the O-ring 14, the distance between the O-ring and the annular sealing surface 17 decreases. A point is reached where the lower valve assembly rises and makes a complete seal between surface 17 and the top of the O-ring. An additional seal is then made between the valve seat 33 and the bottom of the O-ring as the valve assembly is closed completely.

Although water passing underneath the lower valve assembly between surfaces 29, 30 and 32, 32 might be expected to raise the lower valve assembly well away from the seat of the valve port housing 33, a pressure differential is created possibly due to the greater surface area above the lower valve assembly as opposed to below the lower valve assembly. The annular lip 25 helps to maintain this pressure differential, thus keeping the lower valve assembly in close proximity to the seat of the valve port housing 33. In situations where water pressure along is not sufficient to enable the pressure differential effect to maintain the lower assembly in close proximity to the valve seat of the valve port housing 33, a lower spring 34 may be utilized as shown in FIG. 5. The lower spring 34 at its upper end fits into an annular recess 35 in the bottom of the valve disc 10a, the lower end of the lower spring is seated on an annular lip 36 at the bottom of the valve seat member 15. The lower spring is chosen such that its torsion is sufficient to maintain the lower valve assembly in close proximity to the valve seat, regardless of the position of the upper valve assembly. In FIG. 5 this spring is shown as having a lower diameter which is greater than the upper diameter. However, the type and size of the spring may be varied as can the method of retaining it between the lower surface of the upper valve assembly and the upper surface of the lower valve assembly.

Figure 6:
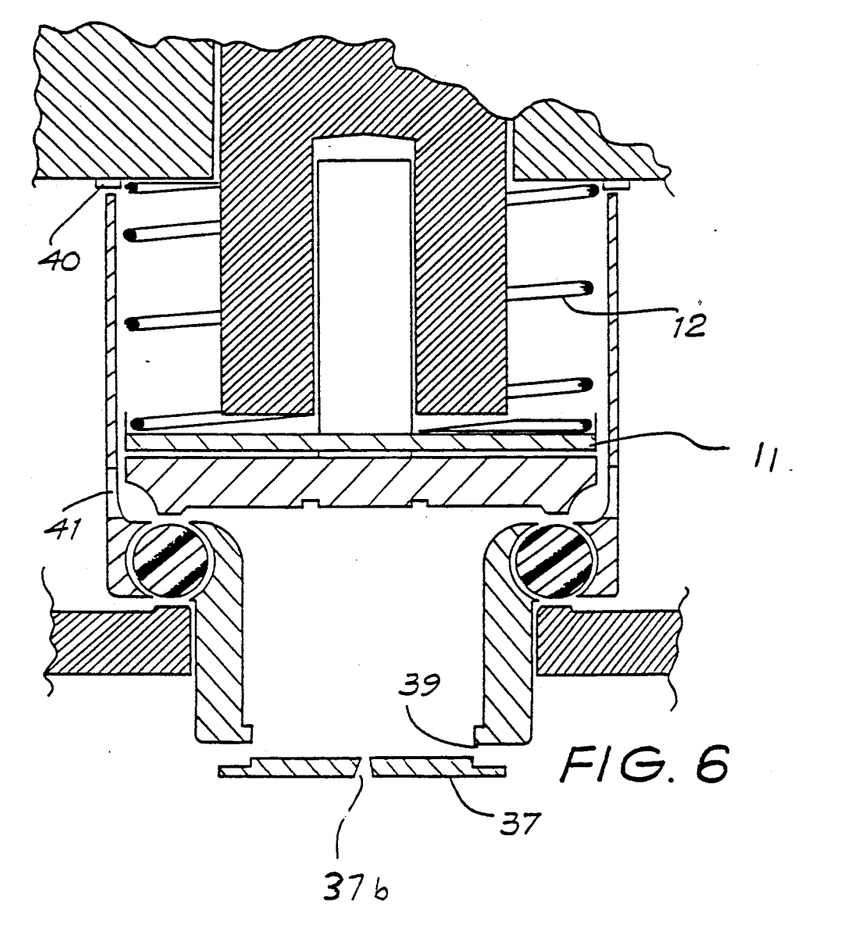
FIG. 6 shows a sectional view of a third embodiment according to the present invention.

Referring now to the upper valve assembly 9a, as illustrated in FIGS. 5–6, the spring retainer 11 acts to separate the lower surface of the tap spindle and the upper surface of the valve disc and serves to minimise rotation and any noise which may result if these surfaces were to contact each other. In addition, the upper spring 12 is placed over the spindle 60 so that it extends between the spindle housing 62 of the tab and the upper surface of the spring retainer 11. The lower end of the upper spring is frictionally contained within the spring retainer so that the rotational effect of the spindle is not transferred to the valve disc 10a. This feature helps to reduce rotational wear between the valve assembly and the valve seat.

In its preferred form the valve assembly also has the advantage of coping with over tightening and if this occurs the valve assembly can absorb the pressure of a spindle being torqued to over 13 Nms. If overtightening does occur, metal to metal contact is produced between points 54 and 55 and between points 20 and 43. This prevents overcompression of the O-ring, thus, increasing its life expectancy.

In addition, the preferred embodiment has the ability to accommodate structural failure. The tactile sensation provided during use of the tap would indicate that a failure had occurred. Thus, were retainer ring 23 to fracture or were the O-ring 14 to fail, the spindle could be turned further until a seal created by metal-to-metal contact would be made between annular sealing surface 17 and valve seat member 15, at points 54 and 55 and at points 20 and 43. Additionally, a second emergency seal would be created since valve disk 10a would press valve seat member 15 against valve port housing 28a with sufficient force to effect a fluid tight seal.

With regard to the valve assembly shown in FIG. 5, it is noted that the lower spring 34 would normally be weaker than the upper spring 12, thus, eliminating back-feeding and would normally be used in those applications where additional control of the lower valve assembly is needed.

With regard to FIG. 6, a further embodiment of the present invention is shown which has the feature of acting as a flow restricter valve. Disc 37 presses, clips or screws into the flanged base 39 of the valve seat member and the size of the aperture 37b controls the maximum flow rate of water therethrough. A selection of discs with various apperture sizes allows individual selection of maximum flow rates.

According to another preferred embodiment of the present invention also illustrated in FIG. 6, the lower valve assembly may be held in place by extending the lip 25 vertically to soft pads 40 attached to the underside of the spindle housing. Large apertures 41 allow fluid to flow through the valve. The elongate lip 25 has the effect of keeping the lower valve assembly 9b in close proximity to the seat of the valve port housing 33, thus negating the use of the lower spring shown in FIG. 5. The flow rate of water can be controlled by varying the sizes of the holes 41 or the aperture 37b through the disc 37.

Figure 7:
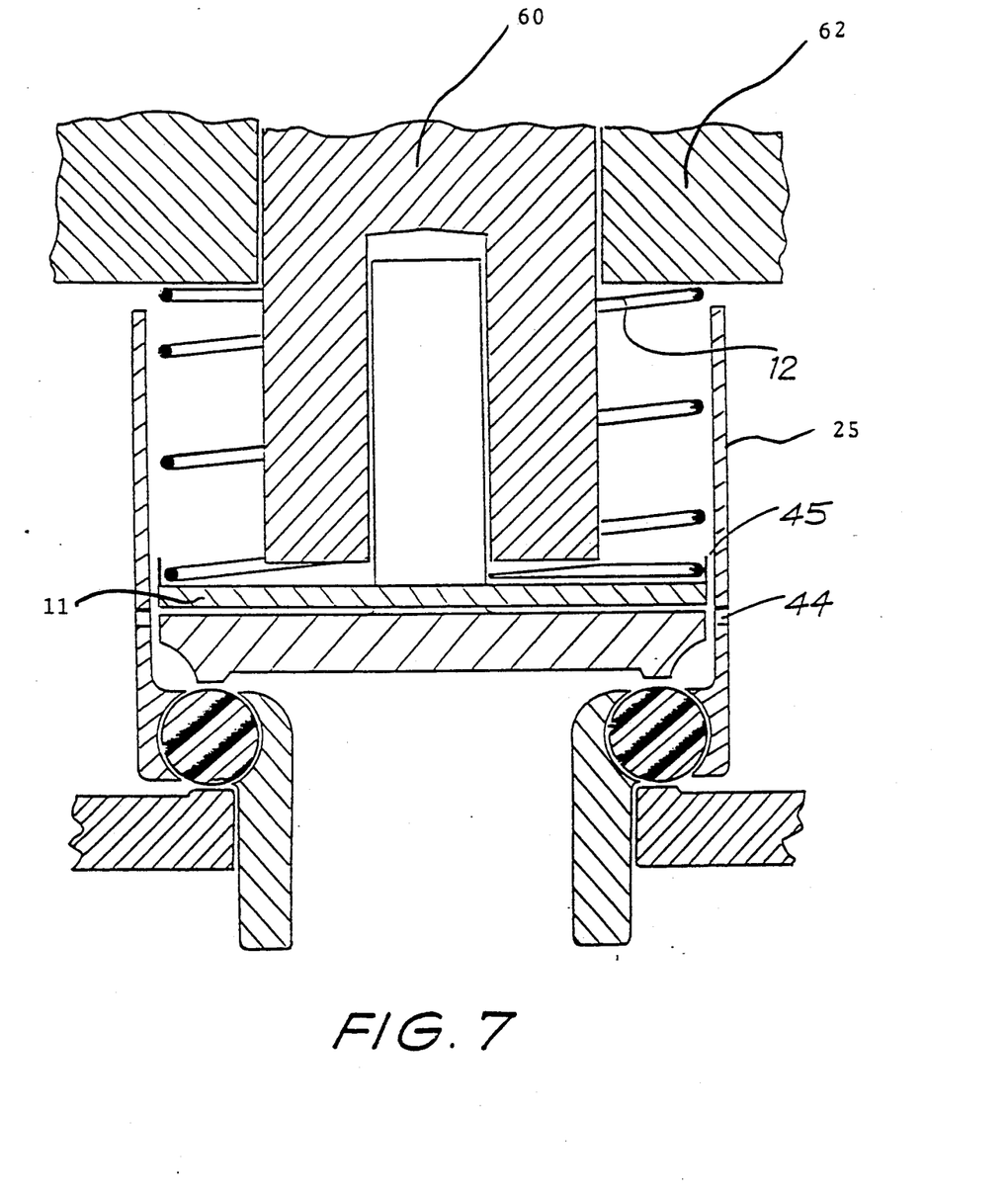
FIG. 7 shows a sectional view of fourth embodiment according to the present invention.

In FIG. 7, the flow restriction is controlled by the aperture at 44 in the extended lip 25. The size and vertical position of the apertures, the size of the gap at 45 and the strength of the spring 12 determines the maximum flow rate for the fully opened position of the upper valve assembly.

In the embodiment shown in FIG. 7, the lip 25 does not extend to the bottom of the spindle housing 62 as the lower valve assembly 9b stays in close proximity to the seat of the valve port housing 33 due to action of water which flows through the valve port valve assembly.

Figure 8:
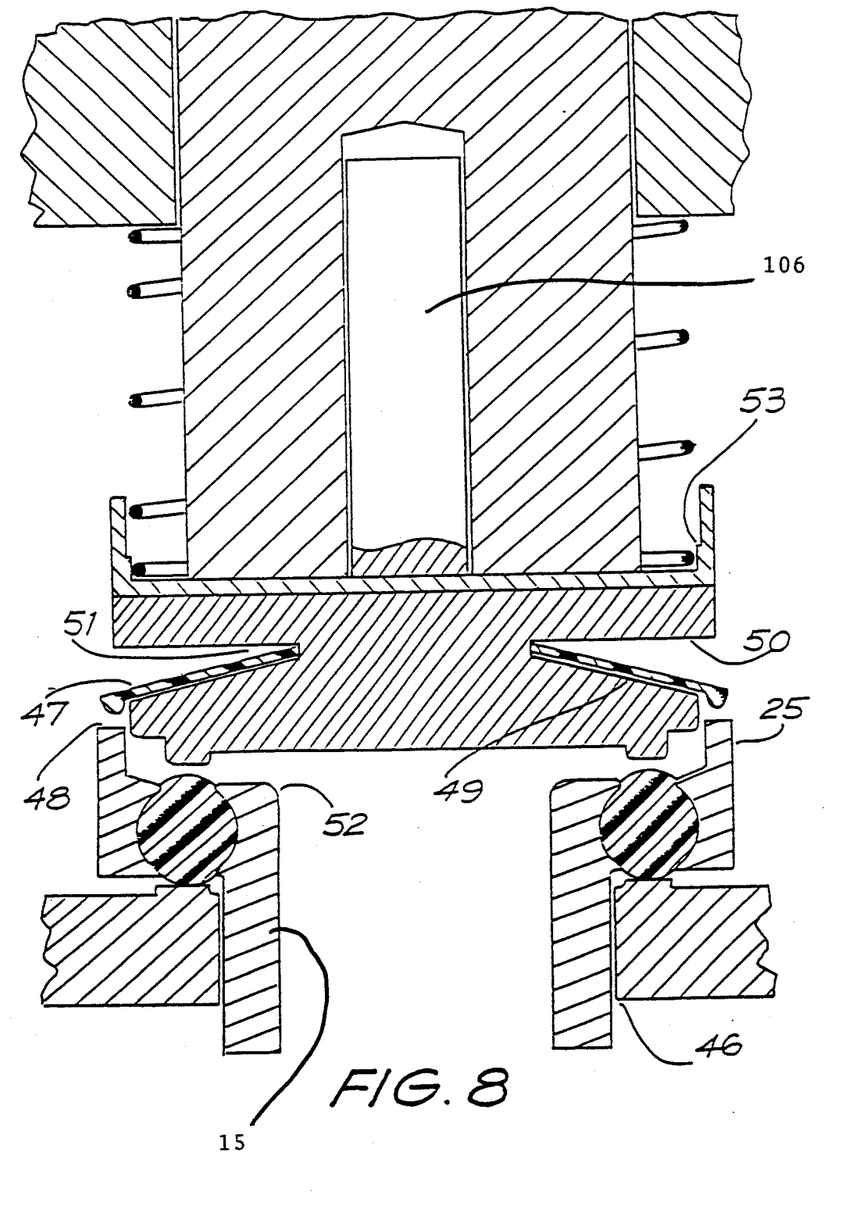
FIG. 8 shows a sectional view of fifth embodiment according to the present invention.

With regard to FIG. 8, a further embodiment of the present invention is shown which has the additional feature of eliminating very low and very high pressure back syphonage. The retaining ring has a thicker extended lip at 48 and the valve seat member 15 is threadingly screwed or forceably pressed into the valve port at 46. At position 52 the valve seat member may be adapted to accept an allen key device for easy installation and/or removal. The valve disc has a groove 51 in its periphery, the upper surface 50 of which is at right angles to the valve stem and whose lower surface 49 is inclined at an angle. In the groove is a rubberised diaphram 47. When the tap is open with no water flowing through it and the valve disc is touching the O-ring, an additional one way seal is achieved by the lower periphery of the diaphram 47 touching the retaining ring at 48. This double feature ensures for applications like meter taps which are normally left open for years that no back feeding can occur at any pressure.

In this embodiment it is also noted that the upper spring is frictionally held inside the retaining ring 11 at its base. The stepped area 53 allows the remainder of the spring to fully (and loosely) fit inside the retainer ring when fully compressed.

In its preferred form shown in FIGS. 6 & 7, the valve assembly has the advantage that there is only a small amount of vertical movement required to open or close a tap to produce the maximum flow of water This is partially due to the upper spring maintaining the upper valve assembly in close proximity to the lower valve assembly. As the tap spindle is opened the upper valve assembly stays in the position determined by the water flow forcing the upper spring. Thus problems associated with water hammer are effectively eliminated as any surge in pressure is damped by the spring and is also of reduced significance as the distance between the upper valve assembly and the lower surface of the spindle is not large enough for the upper valve assembly to reach a sufficient speed to create a sufficient impact with the lower surface of the spindle or to rebound after doing so.

In addition, because rotational friction between the sealing surfaces is virtually eliminated during turning of the spindle, the life expectancy of the valve assembly can be greatly increased.

According to one embodiment of the present invention the upper spring is removed and the lower spring is provided to keep the upper valve assembly away from the lower valve assembly.

According to a further embodiment of the present invention a passage may be Provided from inside the valve seat member to the peripheral groove, thus using water pressure to help to deform the annular sealing member at the point of closing of the valve assembly.

An advantage of the embodiments shown in FIGS. 1 to 7, is that the valve assembly can fit into many existing standard taps and can be removed without the use of special tools.

Although the present invention has been described with regard to a tap fitting utilizing a spindle, it is envisaged that this valve system will also be adaptable to existing single lever tap ware.

I claim:

1. A valve assembly for control of fluid flow in pipes, comprising, a valve body member,
    a valve seat member and an annular sealing member which is arranged to be located around the periphery of the valve seat member, when in use the annular sealing member being arranged to form a seal with the valve body member and a valve seat, when the valve body member is forced against the annular sealing member,
    wherein the valve seat member comprises a retainer ring which is arranged to fit tightly around the outer circumference of the annular sealing member, and the retaining ring comprises a lip on its top surface which lip is arranged to extend beyond the outer periphery of the valve body when in use.

2. A valve assembly according to claim 1, wherein the lip comprises holes which are arranged to allow fluid to pass therethrough.

3. A valve assembly according to claim 2, wherein the lip is arranged to extend substantially parallel to the central axis of the retaining ring.

4. A valve seat member for use in a tap fitting, comprising a tubular body having a peripheral groove in its upper external surface, the valve seat member being arranged to receive an annular sealing member in its peripheral groove so that when in use in a tap fitting the annular sealing member forms a seal with a valve disc and the valve seat of the tap fitting when the valve disc is forced against the annular sealing member,
    wherein a retainer ring is provided which has an internal peripheral groove which is arranged to fit tightly over the annular sealing means and comprises a lip on its top surface which lip is arranged to extend beyond the outer periphery of the valve disc when in use.

5. A valve assembly for control of fluid flow in pipes, comprising, a valve body member,
    a valve seat member and an annular sealing member which is arranged to be located around the periphery of the valve seat member by a locating means, in use the valve seat member and annular sealing member are separated from a valve seat and when the valve body member is forced against the annular sealing member, the annular sealing member then forms a seal with the valve body member and valve seat, wherein the valve seat member comprises a retainer ring which is arranged to fit tightly around an outer circumference of the annular sealing member.

6. A valve assembly according to claim 5, wherein the retaining ring comprises a lip on its top surface which is arranged to extend beyond the outer periphery of the valve body when in use.

7. A valve assembly according to claim 6, wherein the lip comprises holes which are arranged to allow fluid to pass therethrough.

8. A valve assembly according to claim 7, wherein the lip is arranged to extend substantially parallel to a central axis of the retaining ring.

9. A valve assembly for control of fluid flow in pipes, comprising, a valve body member having a lower surface,
    a valve seat member and an annular sealing member which is arranged to be located around the periphery of the valve seat member by a locating means, in use the valve seat member and annular sealing member are separated from a valve seat and when the valve body member is forced against the annular sealing member, the annular sealing member then forms a seal with the valve body member and valve seat, wherein a valve disc of the valve body has an annular sealing surface on a lower face of the disc and the annular sealing surface protrudes from the lower surface of the valve body.

10. A valve assembly according to claim 9, wherein the annular sealing surface is substantially flat.

11. A valve assembly for control of fluid flow in pipes, comprising, a valve body member,
    a valve seat member and an annular sealing member which is arranged to be located around the periphery of the valve seat member by a locating means, in use the valve seat member and annular sealing member are separated from a valve seat and when the valve body member is forced against the annular sealing member, the annular sealing member then forms a seal with the valve body member and valve seat, wherein the valve seat member comprises a retaining means for preventing the valve seat member from falling through the valve port of a tap fitting.

12. A valve assembly according to claim 11, wherein the retaining means comprises a collar which is arranged to rest on the valve seat side of the valve port housing.

13. A valve assembly for control of fluid flow in pipes, comprising, a valve body member having a lower surface, a valve seat member and an annular sealing member which is arranged to be located around the periphery of the valve seat member by a locating means, in use the valve seat member and annular sealing member are separated from a valve seat and when the valve body member is forced against the annular sealing member, the annular sealing member then forms a seal with the valve body member and valve seat, the valve assembly further comprising a spring retainer which is annular and is arranged to fit over a valve stem of the valve body and rest on an upper surface of the valve body, and an upper spring which is arranged to fit over the valve stem of the valve body and rest on the spring retainer.

14. A valve assembly according to claim 13, wherein the spring retainer comprises an upstanding annular portion which is arranged to contain a lower end of the upper spring and reduce sideways movement of the upper spring.

15. A valve seat member for use in a tap fitting, comprising a tubular body having a peripheral groove in its upper external surface, the valve seat member being arranged to receive an annular sealing member in its peripheral groove so that when in use in a tap fitting the annular sealing member forms a seal with a valve disc and the valve seat of the tap fitting upon the valve disc being forced against the annular sealing member, wherein a retainer ring is provided which has an internal peripheral groove which is arranged to fit tightly over the annular sealing means and comprises a lip on its top surface which is arranged to extend beyond the outer periphery of the valve disc when in use.

16. A valve assembly for control of fluid flow in pipes, comprising, a valve body member having a lower peripheral surface which is bevelled, a valve seat member and an annular sealing member which is arranged to be located around the periphery of the valve sat member by a locating means, in use the valve seat member and annular sealing member are separated from a valve seat and when the valve body member is forced against the annular sealing member, the annular sealing member then forms a seal with the valve body member and valve seat, further comprising an upper spring so that when the assembly is inserted in a tap the upper spring extends between a top surface of a tap housing and a spring retainer of the valve body member.

* * * * *